(12) United States Patent
Park

(10) Patent No.: US 8,194,867 B2
(45) Date of Patent: Jun. 5, 2012

(54) METHOD FOR CHECKING AUDIO INTERFACE IN AV SYSTEM AND APPARATUS USING THE SAME

(75) Inventor: Si-hong Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1231 days.

(21) Appl. No.: 11/943,619

(22) Filed: Nov. 21, 2007

(65) Prior Publication Data

US 2008/0310641 A1 Dec. 18, 2008

(30) Foreign Application Priority Data

Jun. 14, 2007 (KR) ........................ 10-2007-0058404

(51) Int. Cl.
*H04R 29/00* (2006.01)
(52) U.S. Cl. ........................................ 381/58; 381/56
(58) Field of Classification Search .................... 381/56, 381/58
See application file for complete search history.

(56) References Cited

U.S. PATENT DOCUMENTS

| | | | |
|---|---|---|---|
| 7,135,985 B2 * | 11/2006 | Woolgar et al. ................ | 340/4.3 |
| 2003/0185400 A1 | 10/2003 | Yoshizawa et al. | |
| 2005/0120383 A1 * | 6/2005 | Ozaki et al. ................... | 725/131 |
| 2006/0245725 A1 | 11/2006 | Lim | |
| 2008/0168519 A1 * | 7/2008 | Rao et al. ...................... | 725/127 |
| 2008/0270632 A1 * | 10/2008 | Hong et al. ........................ | 710/4 |
| 2008/0270636 A1 * | 10/2008 | Hong et al. ........................ | 710/9 |
| 2008/0271073 A1 * | 10/2008 | Kim et al. ...................... | 725/37 |
| 2009/0051565 A1 * | 2/2009 | Yung et al. ............... | 340/825.22 |

FOREIGN PATENT DOCUMENTS

| | | | | |
|---|---|---|---|---|
| JP | 09-154077 | * | 6/1997 | ........................ 5/445 |
| JP | 09154077 A | | 6/1997 | |
| JP | 2005250342 A | | 9/2005 | |
| KR | 10-2004-0066383 A | | 7/2004 | |

OTHER PUBLICATIONS

Extended European Search Report, dated Jul. 23, 2010, issued in counterpart application No. 08154086.6.

* cited by examiner

*Primary Examiner* — Victor A Mandala
(74) *Attorney, Agent, or Firm* — Sughrue Mion, PLLC

(57) ABSTRACT

A method for checking availability of audio interface between a display apparatus and an AV apparatus in an AV system, and an AV apparatus using the same are provided. The checking includes transmitting a command to check an audio interface to a second AV apparatus where an audio from a first AV apparatus is output, and receiving a result of checking the audio interface in response to the command from the second AV apparatus. Therefore, a user can recognize whether or not an audio interface has a problem in an AV system.

19 Claims, 5 Drawing Sheets

METHOD FOR CHECKING AUDIO INTERFACE IN AV SYSTEM AND APPARATUS USING THE SAME

CROSS-REFERENCE TO RELATED APPLICATIONS

This application claims priority under 35 U.S.C. §119 from Korean Patent Application No. 10-2007-0058404, filed on Jun. 14, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to an audio-visual (AV) system and a method for checking thereof, and more particularly, to a method for checking availability of audio interface between a display apparatus and an AV apparatus in an AV system, and an AV apparatus using the same.

2. Description of the Related Art

Interest has increased greatly in digital content recently. A digital versatile disc (DVD) to record and reproduce video with high quality has particularly been used increasingly, and digital televisions (TV) of high resolution have been developed. Interfaces such as a high definition multimedia interface (HDMI) to transmit data between a DVD apparatus and a TV have been standardized. The HDMI is a broadcasting standard to protect multimedia content in an HDTV, and serves as a multimedia interface to transmit uncompressed digital video and audio.

More and more consumers want to connect HDMI between TV, DVD apparatus, and so on with a receiver including an amplifier and a decoder, to improve the audio quality of a home theater.

If the DVD apparatus is connected with the receiver using the same port as the TV, video and audio are transmitted through HDMI. Accordingly, a user can watch video through the TV and listen to audio through the receiver.

However, if the DVD apparatus is connected with the receiver using a different port than the TV, a separate audio interface is required between the TV and the receiver. This is because the TV would mute audio, and output video only. Because the TV is connected with the receiver through HDMI, the TV can receive video and audio through HDMI, but cannot transmit audio to the receiver. If the separate audio interface is not connected to the TV, output of audio through the receiver is impossible. As a result, a user would have to watch video without audio.

However, a user does not know whether to connect an audio interface, or where to connect the audio interface.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a method for checking whether an audio interface is connected appropriately between a receiver and a display apparatus, and an AV apparatus using the same.

According to an exemplary aspect of the present invention, there is provided a method for managing AV apparatus comprising transmitting by a display apparatus a command to check an audio interface to a second AV apparatus where an audio from a first AV apparatus is output; and receiving by the display apparatus a result of checking the audio interface received from the second AV apparatus in response to the command.

The transmitting may transmit the command to check an audio interface, if the first and second AV apparatuses are connected with different ports of the display apparatus.

Whether or not the first and second AV apparatuses are connected with the different ports may be determined with reference to physical addresses of the first and second AV apparatuses.

The checking may comprise determining that the first and second AV apparatuses are connected with the same port, if first digits of the physical addresses of the first and second AV apparatuses are same, and determining that the AV apparatuses are connected with different ports, if the first digits of the physical addresses are different.

The checking an audio interface may comprise determining whether or not audio cables are connected between the display apparatus and the second AV apparatus.

The audio cables may be optical fibers.

The method may further comprise displaying by the display apparatus the result of checking the audio interface received from the second AV apparatus.

The displaying may be conducted, if the result of checking the audio interface indicates a problem.

The display apparatus may be a television (TV), and the second AV apparatus may be an audio output apparatus.

The interface between the display apparatus and the first AV apparatus may comprise interfaces according to a high definition multimedia interfaces-consumer electronics control (HDMI-CEC) standard.

According to an exemplary aspect of the present invention, there is provided a display apparatus comprising an interface which is communicably connected with a first AV apparatus, and with a second AV apparatus where an audio from the first AV apparatus is output; and a control unit which transmits a command to check an audio interface to the second AV apparatus through the interface, and which receives a result of checking the audio interface in response to the command from the second AV apparatus through the audio interface.

The control unit may transmit the command to check an audio interface, if the first and second AV apparatuses are connected with different ports of the display apparatus.

Whether or not the first and second AV apparatuses are connected with the different ports may be determined with reference to physical addresses of the first and second AV apparatuses.

The checking may comprise determining that the first and second AV apparatuses are connected with the same port, if first digits of the physical addresses of the first and second AV apparatuses are the same, and determining that the AV apparatuses are connected with different ports, if the first digits of the physical addresses are different.

The checking an audio interface may comprise determining whether or not audio cables are connected between the display apparatus and the second AV apparatus.

The audio cables may be optical fibers.

The apparatus may further comprise a display which displays an image, wherein the control unit causes the result of checking the audio interface, received from the second AV apparatus, to be displayed on the display.

The control unit may cause the result of checking the audio interface to be displayed, if the result of checking the audio interface indicates a problem.

The second AV apparatus may be an audio output apparatus.

The interface connected to the first AV apparatus may comprise an interface according to a high definition multimedia interfaces-consumer electronics control (HDMI-CEC) standard.

According to another exemplary aspect of the present invention, there is provided a method for checking an audio interface comprising transmitting by a display apparatus a command to check an audio interface to an external first AV apparatus; and receiving the result of checking the audio interface from the first AV apparatus.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Figure 1:
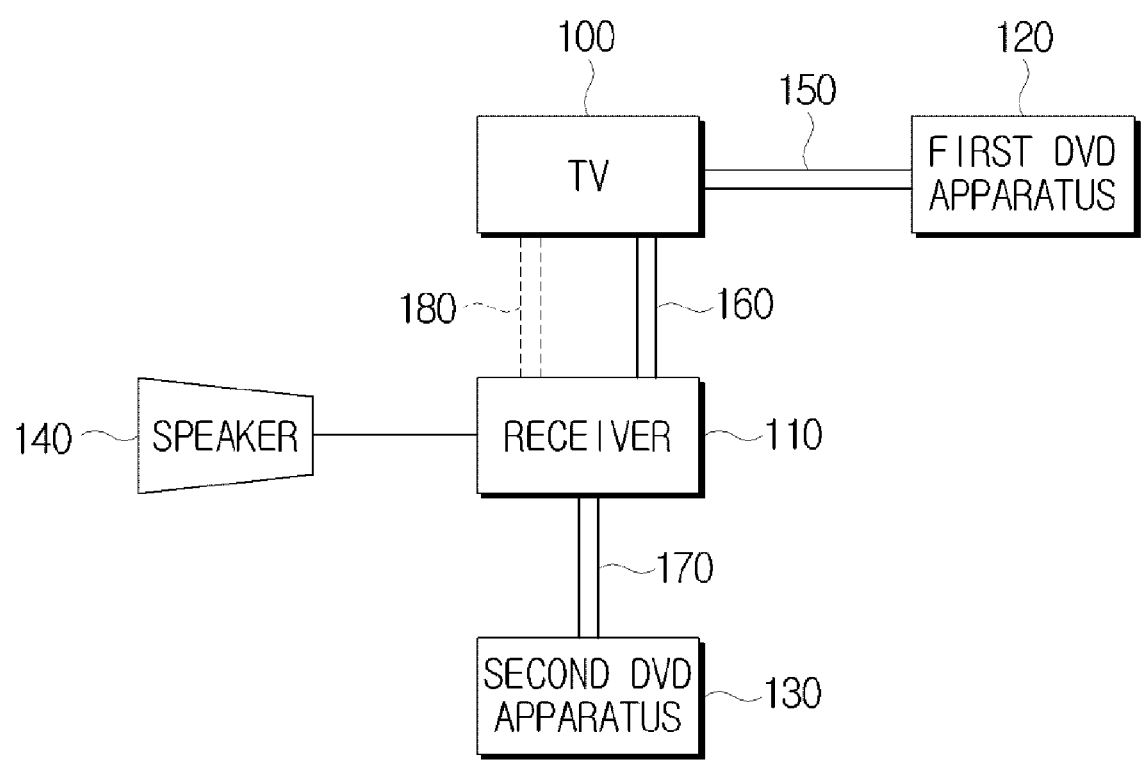
FIG. 1 is a view illustrating the structure of an audio-visual (AV) system.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since that would obscure the invention with unnecessary detail.

FIG. 1 is a view illustrating the structure of an audio-visual (AV) system. A home theater may comprise a receiver 110 connected with a TV 100 and a speaker 140, and two DVD apparatuses 120, 130.

Connection 150 between the TV 100 and the first DVD apparatus 120 meets a high definition multimedia interfaces-consumer electronics control (HDMI-CEC) standard. Connection 160 between the TV 100 and the receiver 110, and connection 170 between the receiver 110 and the second DVD apparatus 130 also meet the HDMI-CEC standard.

A separate audio interface 180 is connected between the TV 100 and the receiver 110 to output an audio from the first DVD apparatus 120 via the receiver 110.

Figure 2:
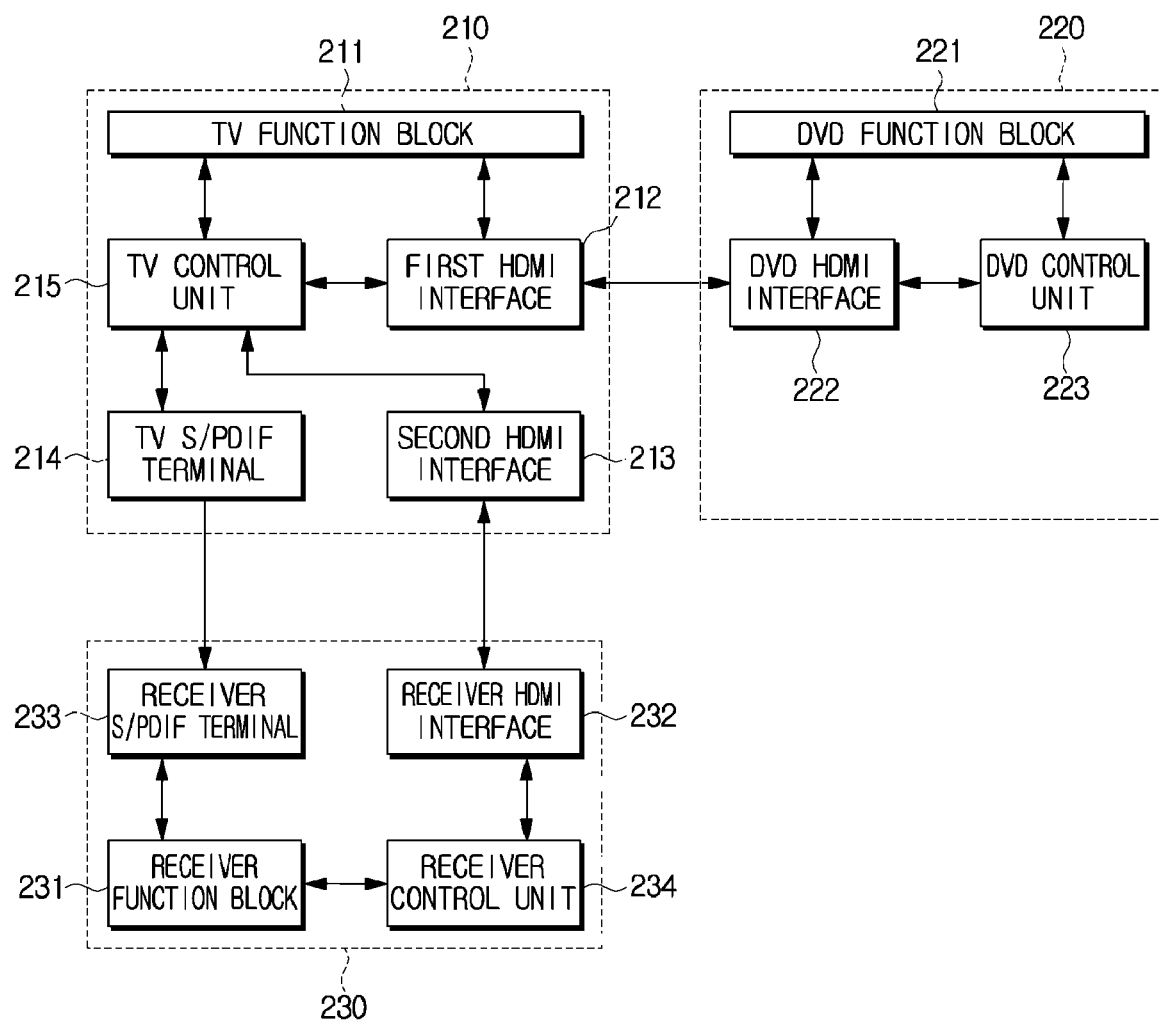
FIG. 2 is a block diagram of AV apparatuses according to an exemplary embodiment of the present invention.

FIG. 2 is a block diagram of AV apparatuses according to an exemplary embodiment of the present invention, which illustrates a TV 210, a DVD apparatus 220, and a receiver 230.

Referring to FIG. 2, the DVD apparatus 220 may comprise a DVD function block 221, a DVD HDMI 222, and a DVD control unit 223.

The DVD function block 221 performs the general functions of a DVD apparatus, including video and audio signal processing. DVD HDMI 222 connects video and audio signals processed by the DVD function block 221 with the TV 210 so as to communicate. The DVD control unit 223 controls the DVD function block 221, and the DVD HDMI 222.

The receiver 230 may comprise a receiver function block 231, a receiver HDMI 232, a receiver Sony/Philips digital interface (S/PDIF) terminal 233, and a receiver control unit 234.

The receiver function block 231 performs the general functions of a receiver. The receiver HDMI 232 is connected between the receiver 230 and the TV 210 for communication. The receiver S/PDIF terminal 233 receives audio from the TV 210 in a digital data form through optical fibers.

The receiver control unit 234 controls the receiver function block 231, the receiver HDMI 232, and the receiver S/PDIF terminal 233.

The TV 210 may comprise a TV function block 211, a first HDMI 212, a second HDMI 213, a TV S/PDIF terminal 214, and a TV control unit 215.

The TV function block 211 performs the general function of a TV, which includes, tuning to and demodulating one of broadcast channels, broadcast signal processing such as decoding and scaling, or broadcasting.

The first HDMI 212 is connected with the DVD apparatus 220, and the second HDMI 213 is connected with the receiver 230, to communicate according to the HDMI-CEC standard.

The TV S/PDIF terminal 214 transmits digital audio data to the receiver 230 through optical fibers.

The TV control unit 215 controls the first HDMI 212 to receive video and audio from the DVD apparatus 220. The TV control unit 215 controls the TV function block 211 to reproduce the received video, and transmits the received audio to the receiver 230 through the TV S/PDIF terminal 214. The TV control unit 215 transmits the audio to the receiver 230, and concurrently controls the TV function block 211 not to output the audio from the TV 210.

If the optical fibers are not connected adequately between the S/PDIF terminals 214, 233 of the TV 210 and the receiver 230, the audio is not output. To prevent this, the control unit 215 transmits a command for checking an audio interface to the receiver 230 through the second HDMI 213, receives response to the command for checking an audio interface from the receiver control unit 234, and subsequently controls the TV function block 211 to display the result.

The control function of the TV control unit 215 will be explained in detail with reference to FIG. 3.

Figure 3:
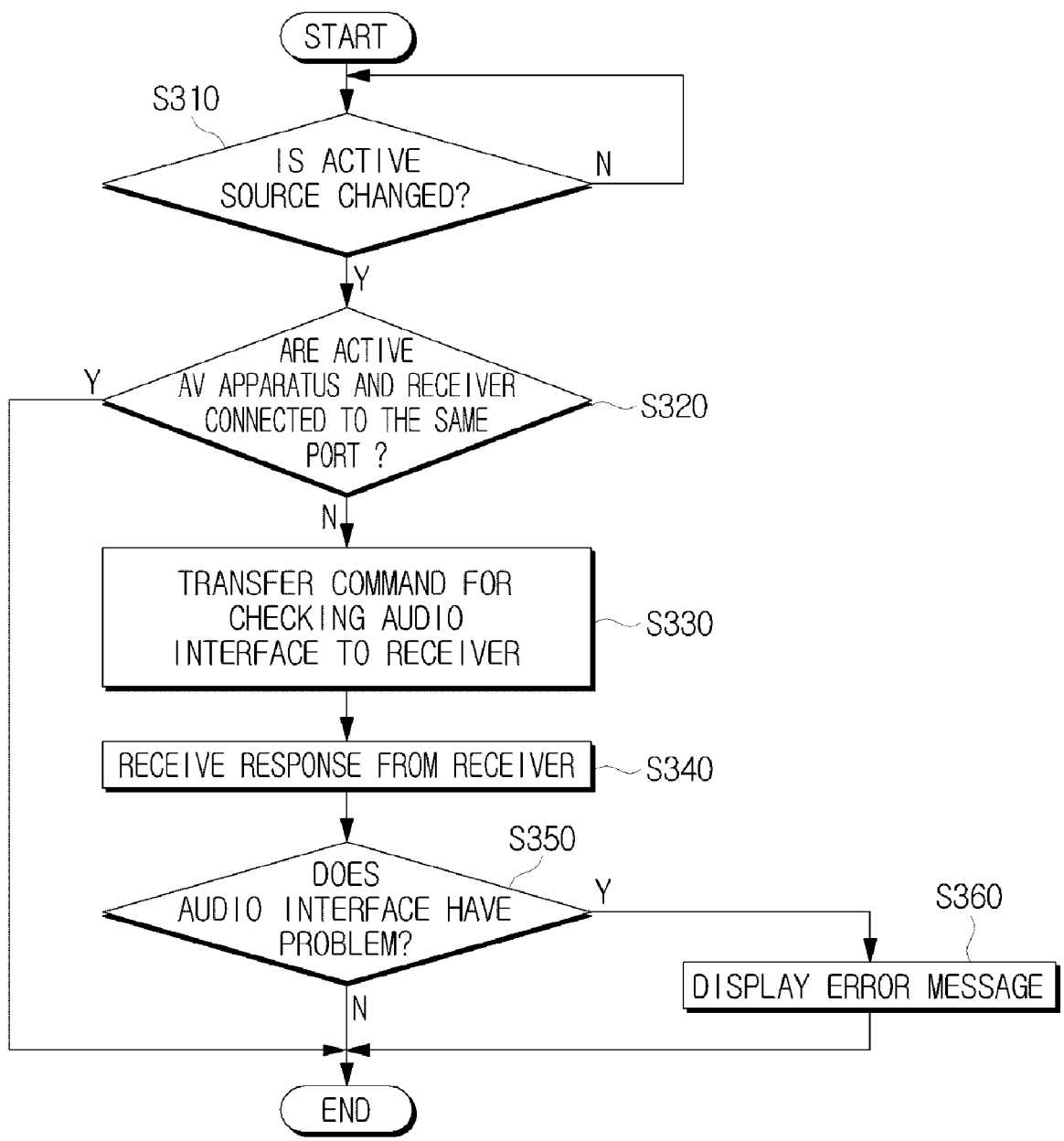
FIG. 3 is a flowchart to explain a method for checking an audio interface of an AV apparatus.

FIG. 3 is a flowchart to explain a method for checking an audio interface of an AV apparatus.

The TV control unit 215 checks whether or not an active source is changed (S310).

That the active source is changed means that the receiver attempts a connection for the first time, or a video or audio source received from the TV is changed. That is, the active source is changed when a user either newly connects a DVD, or selects one of the connected AV apparatuses by an external input using a remote control or buttons.

With reference to FIG. 1, it is assumed that the first external input of the TV 100 is connected with the first DVD apparatus 120, the second external input of the TV 100 is connected with the receiver 110, and the third external input of the TV 100 is connected with the second DVD apparatus 130. If a user selects the first external input while operating the TV, the first DVD apparatus 120 is the active source.

Referring back to FIG. 3, the TV control unit 215 checks whether the first DVD apparatus 120, as an active AV apparatus, and the receiver 110 are connected to the same port of the TV 100 (S320).

Various methods are available for checking whether the apparatuses are connected to the same port. One of these methods will be explained below.

The TV control unit 215 extracts a physical address of the first DVD apparatus 120 through the first HDMI 212, and extracts a physical address of the receiver 110 through the second HDMI 213.

If a physical address of the receiver 110 is 1.0.0.0, the first digit of a physical address of the first DVD apparatus 120 may differ from the first digit 1 of the physical address of the receiver 110. For example, the physical address of the first DVD apparatus 120 may be 2.X.X.X. On the other hand, if the second DVD apparatus 130 is the active source, the second DVD apparatus 130 is connected to a subordinate of the receiver 110 so that with respect to the TV, the second DVD apparatus 130 and the receiver 110 are connected to the same port. The physical address of the second DVD apparatus is 1.X.X.X.

Based on the comparison of the physical addresses of the receiver 110 and the AV apparatus, it is determined that the AV apparatus and the receiver 110 are connected to the same port, if the first digits of the physical addresses are the same. On the other hand, if the first digits of the physical addresses are different, the AV apparatus and the receiver 110 are determined as being connected to different ports.

If the second DVD apparatus 130 is the active source, and if the active source and the receiver 110 are at the same port (S320-Y), audio output from the second DVD apparatus 130 is output via the receiver 110 without a problem even when optical fibers are inadequately connected to S/PDIF terminals between the TV 210 and the receiver 230. Accordingly, the process of managing the AV apparatus according to an exemplary embodiment of the present invention is terminated.

On the other hand, the active source and the receiver 110 are at different ports (S320-N), if the first DVD apparatus 120 is the active source. In this case, if optical fibers are inadequately connected to S/PDIF terminals between the TV 210 and the receiver 230, audio from the first DVD apparatus 120 is not output via the receiver 110.

The TV control unit 215 transfers a command for checking an audio interface to the receiver control unit 234 via the second HDMI 213 (S330).

The receiver control unit 234 checks whether an audio signal is properly input to the receiver S/PDIF terminal 233, and subsequently the TV control unit 215 receives the result (S340).

If it is determined that the audio interface has a problem according to the result received from the receiver control unit 234 (S350-Y), the TV control unit 215 controls the TV function block 210 to display an error message (S360).

Figure 4:
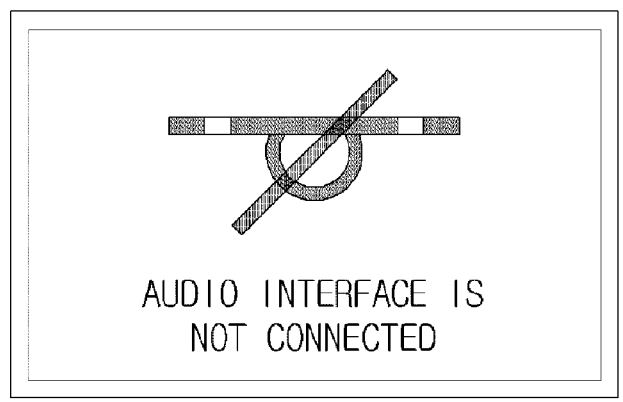
FIG. 4 is a view illustrating an example of a message displayed on a screen when an error is occurred.

An example of an error message is illustrated in FIG. 4. An error may be represented by an icon or a message expressing that the audio interface is inadequately connected.

A detailed description may be displayed instead of the message representing that the audio interface is inadequately connected as shown in FIG. 4.

Additionally, if it is determined that the audio interface has a problem by the result received from the receiver control unit 234 (S350-Y), the TV control unit 215 controls the TV function block 210 to output an audio signal from a speaker of the TV.

The process of checking an audio interface between the TV 100 and the receiver 110 has been described with an exemplary embodiment of the present invention.

Although a TV is provided as a display apparatus in an exemplary embodiment of the present invention, display apparatuses other than a TV may be applicable to the present invention.

An AV apparatus is not limited to a DVD apparatus. In the alternative, various other AV apparatuses such as a personal computer (PC), a notebook, and a play station 3 (PS3) may be used, supporting HDMI-CEC.

A display apparatus is connected with an AV apparatus using HDMI-CEC in an exemplary embodiment of the present invention, but it is not limited thereto. It is possible to use interfaces such as Institute of Electrical and Electronics Engineers (IEEE) 1394 or universal serial bus (USB) which transmits a control signal along with video and audio.

S/PDIF is described as an example of an audio interface, but the audio interface is not limited to the S/PDIF. Additionally, it may be possible to use a component cable, a composite cable, or a coaxial cable instead of optical fibers as cables to connect S/PDIF terminals.

An AV may be embodied differently from the structures shown in FIGS. 1 and 2.

Another exemplary embodiment of the present invention will be explained in detail with reference to FIGS. 5 and 6.

Figure 5:
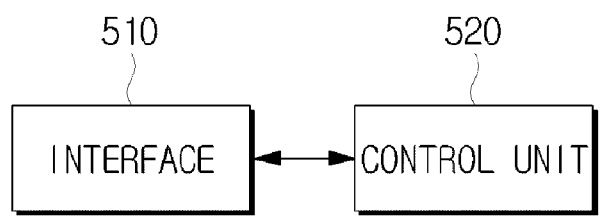
FIG. 5 is a block diagram of AV apparatuses according to another exemplary embodiment of the present invention.

Referring to FIG. 5, a display apparatus according to another exemplary embodiment of the present invention may comprise an interface 510 and a control unit 520.

The interface 510 is connected with a first AV apparatus and a second AV apparatus to output audio from the first AV apparatus, for communication.

The control unit 520 transmits a command for checking an audio interface to the second AV apparatus through the interface and receives a response to the command from the second AV apparatus through the interface.

Figure 6:
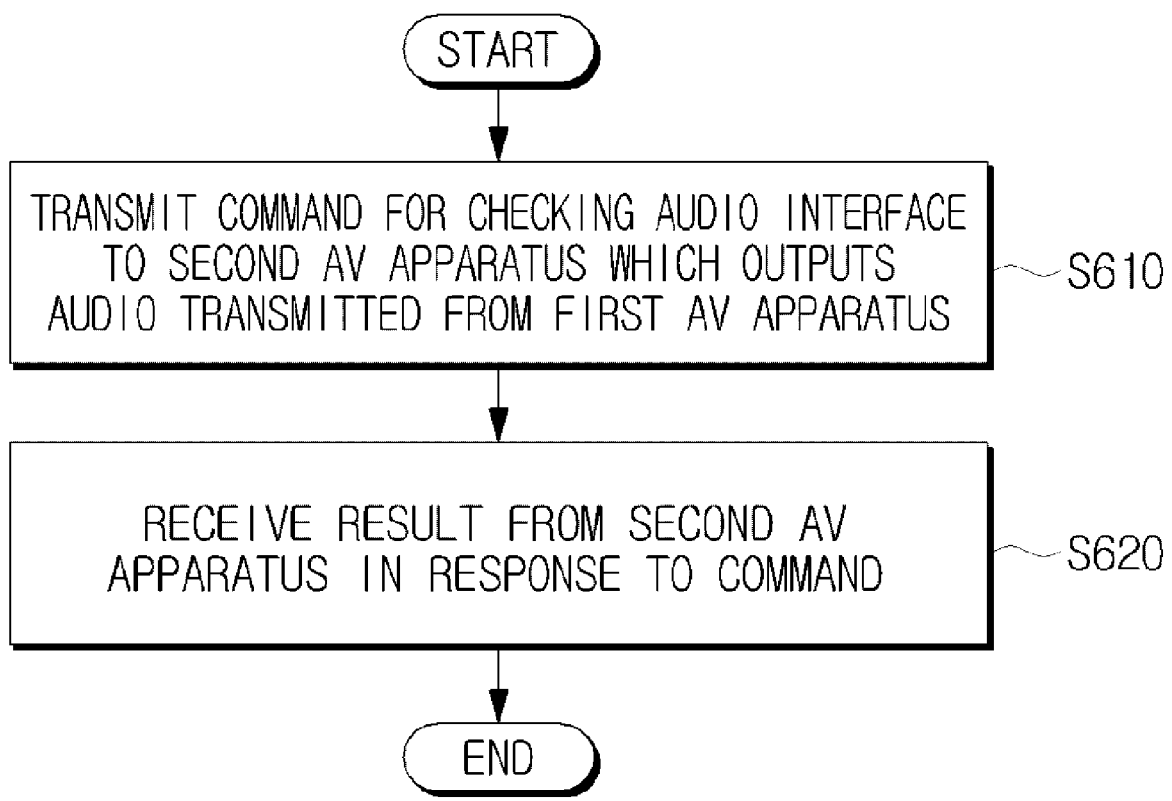
FIG. 6 is a flowchart to explain a method for checking an audio interface of AV apparatuses according to another exemplary embodiment of the present invention.

Referring to a checking method shown in FIG. 6, the control unit 520 transmits a command for checking an audio interface to the second AV apparatus which outputs audio transmitted from the first AV apparatus (S610). The control unit 520 receives the result from the second AV apparatus in response to the command (S620).

By doing so, an AV system may check an audio interface.

As described above, a user can recognize that an audio interface is properly connected between a receiver and a display according to exemplary embodiments of the present invention. The user can easily find the cause when audio is not output, and can solve problems accordingly. It is also beneficial for the manufacturer because customer requests for repair are reduced.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for managing AV apparatus comprising: transmitting by a display apparatus a command to check an audio interface to a second AV apparatus to which an audio signal from a first AV apparatus is output, the first AV apparatus and the second AV apparatus being separate devices; and receiving by the display apparatus a result of checking the audio interface received from the second AV apparatus in response to the command, wherein the transmitting transmits the command to check an audio interface, if the first and second AV apparatuses are connected with different ports of the display apparatus.

2. The method of claim 1, wherein whether or not the first and second AV apparatuses are connected with the different ports is determined with reference to physical addresses of the first and second AV apparatuses.

3. The method of claim 2, wherein the checking comprises determining that the first and second AV apparatuses are connected with the same port, if first digits of the physical addresses of the first and second AV apparatuses are identical, and determining that the AV apparatuses are connected with different ports, if the first digits of the physical addresses are different.

4. The method of claim 1, wherein the checking an audio interface comprises determining whether or not audio cables are connected between the display apparatus and the second AV apparatus.

5. The method of claim 4, wherein the audio cables are optical fibers.

6. The method of claim 1, further comprising:
displaying by the display apparatus the result of checking the audio interface received from the second AV apparatus.

7. The method of claim 6, wherein the displaying is conducted, if the result of checking the audio interface indicates a problem.

8. The method of claim 1, wherein the display apparatus is a television (TV), and the second AV apparatus is an audio output apparatus.

9. The method of claim 1, wherein the interface between the display apparatus and the first AV apparatus comprises interfaces according to a high definition multimedia interfaces-consumer electronics control (HDMI-CEC) standard.

10. A display apparatus comprising: an interface which is communicably connected with a first AV apparatus, and with a second AV apparatus to which an audio signal from the first AV apparatus is output, the first AV apparatus and the second AV apparatus being separate devices; and a control unit which transmits a command to check an audio interface to the second AV apparatus through the interface, and which receives a result of checking the audio interface in response to the command from the second AV apparatus through the audio interface, wherein the control unit transmits the command to check an audio interface, if the first and second AV apparatuses are connected with different ports of the display apparatus.

11. The apparatus of claim 10, wherein whether or not the first and second AV apparatuses are connected with the different ports is determined with reference to physical addresses of the first and second AV apparatuses.

12. The apparatus of claim 11, wherein the checking comprises determining that the first and second AV apparatuses are connected with the same port, if first digits of the physical addresses of the first and second AV apparatuses are identical, and determining that the AV apparatuses are connected with different ports, if the first digits of the physical addresses are different.

13. The apparatus of claim 10, wherein the checking an audio interface comprises determining whether or not audio cables are connected between the display apparatus and the second AV apparatus.

14. The apparatus of claim 13, wherein the audio cables are optical fibers.

15. The apparatus of claim 10, further comprising:
a display which displays an image,
wherein the control unit causes the result of checking the audio interface, received from the second AV apparatus, to be displayed on the display.

16. The display apparatus of claim 15, wherein the control unit causes the result of checking the audio interface to be displayed, if the result of checking the audio interface indicates a problem.

17. The apparatus of claim 10, wherein the second AV apparatus is an audio output apparatus.

18. The apparatus of claim 10, wherein the interface connected to the first AV apparatus comprises an interface according to a high definition multimedia interfaces-consumer electronics control (HDMI-CEC) standard.

19. A method for checking an audio interface comprising transmitting by a display apparatus a command to check an audio interface to an external first AV apparatus; and receiving the result of checking the audio interface from the first AV apparatus, wherein the transmitting transmits the command to check an audio interface, if a port connected with the first AV apparatus and a port receiving an audio to be outputted to the first AV apparatus are different ports of the display apparatus.

* * * * *